United States Patent [19]

Crockett

[11] Patent Number: 6,058,376

[45] Date of Patent: May 2, 2000

[54] PROCESS FOR EVALUATING THE FINANCIAL CONSEQUENCES OF CONVERTING A STANDARD FORM I.R.A. TO THE ROTH FORM I.R.A.

[76] Inventor: David A. Crockett, Rte. 1, Box 112-A, Marionville, Mo. 65705

[21] Appl. No.: 08/999,151

[22] Filed: Dec. 29, 1997

[51] Int. Cl.[7] .................................................... G06F 19/00
[52] U.S. Cl. .................................................. 705/35; 705/4
[58] Field of Search ................................... 705/36, 39, 35, 705/4

[56] References Cited

U.S. PATENT DOCUMENTS

| | | | |
|---|---|---|---|
| 4,648,037 | 3/1987 | Valentino | 705/39 |
| 5,479,344 | 12/1995 | Keziah, Jr. | 705/4 |
| 5,523,942 | 6/1996 | Tyler et al. | 705/4 |
| 5,680,305 | 10/1997 | Apgar, IV | 705/10 |
| 5,774,881 | 6/1998 | Friend et al. | 705/36 |
| 5,878,405 | 3/1999 | Grant et al. | 705/39 |

OTHER PUBLICATIONS

Lazzareschi, Carla "Converting Your IRA to a Roth Account Could Be a Smart Move—Especially in '98" Los Angeles Times col. D p3 retreived from Dialog file #630 Jul. 28, 1999, Nov. 1997.

Anderson, Arthur "Taxpayer Relief Act of 1997 Special Report" Electronic Citation : 97 TNT 155–34 retrieved from Dialog File #790 on Jul. 28, 1999, Aug. 1997.

Ring, Niamh "Fielity Adds IRA Calculator to Web Site" American Banker vol. 162 Issue 243 p8, Dec. 1997.

Cohn, Michael "Linking Planning to Tax Prep" Part 2 or 2 Accounting Technology v13 n2 p 52–57 retrieved from Dialog File#13 on Jul. 28, 1999, Feb. 1997.

Hogan , Mike "Plan to retire with confidence" PC Computing v8 n8 p77, Jul. 1995.

Yakal, Kathy "Quicken Financial Planner Helps Analyze and Improce Your Retirement" Computer Shopper v16 n9 p527 retreived from Dialog File# 256 on Jul. 28, 1999, Sep. 1996.

Brentmark Software's Pension & Excise Tax Planner User's Manual—cited pages, Jul. 1997.

*Primary Examiner*—Allen R. MacDonald
*Assistant Examiner*—Penny Caudle
*Attorney, Agent, or Firm*—Jonathan A. Bay

[57] ABSTRACT

Disclosed is a computer-implemented process for evaluating the financial consequences of converting a standard format IRA to a new Roth form IRA. The process includes computing and disclosing the substantial federal income tax consequences involved in converting the standard form IRA to the Roth form. It further includes multiple options that how a given IRA holder can cope with the substantial tax consequences, including without limitation how he or she will fare if he or she obtains term insurance on the federal tax liability of early withdrawal by reason of premature death, or if he or she deducts the federal taxes and insurance premium from the rollover amount, or in the alternative how he or she will fare by financing the federal tax consequences and insurance premium in order to preserve intact the entire IRA amount for rollover. Additionally, the disclosed process allows IRA holders to enter into the calculations estimated increases in federal tax rates which would be in effect in their retirement years. Whereas it is not known how the federal tax rates will change (if at all) in the ensuing years, the disclosed process will allow entry of educated guesses so that a given IRA holder can work through various chosen scenarios to see how he or she will fare under the chosen scenarios.

10 Claims, 9 Drawing Sheets

Marginal Tax Rates

|  | Federal | State |
|---|---|---|
| 1998 | 28.00% | 6.00% |
| 1999 | 28.00% | 6.00% |
| 2000 | 28.00% | 6.00% |
| 2001 | 28.00% | 6.00% |
| At 59 | 38.00% | 6.00% |
| At 70 | 41.00% | 6.00% |

Copyright © 1997 Computer Management Systems, Inc

*FIG. 11a.*

Out of Pocket Expenses

Total Amt: $19,753

Future Value of Out-of-Pocket Expenses If Invested at 10.% instead of using to rollover IRA:

|  | At 59 | At 70 |
|---|---|---|
| Gross Value (Pre-Tax) | $79,780 | $227,623 |
|  | (25-yr annuity) | (16-yr annuity) |
| Annuity After-Tax | $6,065 | $19,946 |
| Total Annuity After-Tax | $151,615 | $319,130 |

Copyright © 1997 Computer Management Systems, Inc

*FIG. 11b.*

Finance Options

Amt to Finance: $19,750

Payment Option: ● Monthly  ○ Yearly

No. Of Payments: 120

Interest Rate: 9.50%

Payment Amt: $256

Total Payments: $30,667

Credit Life Prem for First Year: $55

Approx. Amt of Interest 1st Year: $1,823
(interest may be tax-deductible)

Calculate

Copyright © 1997 Computer Management Systems, Inc

PROCESS FOR EVALUATING THE FINANCIAL CONSEQUENCES OF CONVERTING A STANDARD FORM I.R.A. TO THE ROTH FORM I.R.A.

A portion of the disclosure of this patent document contains material which is subject to copyright protection. The copyright owner has no objection to facsimile reproduction by anyone of the patent document or the patent disclosure, as it appears in the Patent & Trademark Office file or records, but otherwise reserves all copyright rights whatsoever.

BACKGROUND AND SUMMARY OF THE INVENTION

The invention generally relates to computers and data processing systems for financial planning purposes such as managing savings, tax and investment matters and the like. More particularly, the invention relates to a process for evaluating the financial consequences of converting an Individual Retirement Account (hereinafter "IRA") of the standard format to a new Roth form IRA. A number of additional features and objects will be apparent in connection with the following discussion of preferred embodiments and examples.

Congress has passed the recent Taxpayer Relief Act of 1997, and it created an alternative to the existing standard form IRA, which has been termed the "Roth" form IRA after Senate Finance Committee Chairman William V. Roth, Jr. Taxpayers with moderate current incomes—especially the self-employed or small-firm professionals and others who rely on IRAs for tax-advantaged retirement savings—are given the opportunity to make things simple:—pay the tax now, then forget about federal taxes on those IRA assets, no matter how much they grow.

Briefly, differences between the existing IRA format (which is termed here the "standard" form IRA) and the new Roth form IRA include the following. Under the standard form IRA, employed workers and spouses each could contribute $2,000 per year to IRAs, subject to strict rules for deductibility of contributions. A 10 percent penalty is imposed on most withdrawals made before age 59½. The IRA account-holder must elect some year between ages 59½ and 70½ to begin withdrawing from his or her IRA, and then do so in accordance with strict rules on minimum distribution. Such as, if the account-holder begins withdrawing from the standard form IRA at age 59½, then he or she must draw it down as if it were a 25-hear annuity (for comparison, if withdrawals are delayed until age 70½, then the account-holder must draw down the IRA as if it were a 16-year annuity). Most significantly, withdrawals are fully taxable income.

The new Roth form IRA will allow employed workers and spouses a $2,000 per year contribution each. No tax deduction is allowed for contributions to a Roth IRA, but the income continues to accumulate tax-free. Unlike the standard form IRAs' qualified distributions from a Roth IRA are not includable in income and are not subject to penalty taxes. A "qualified distribution" requires that funds accumulate in the Roth IRA for at least five years following the initial contribution and that withdrawals are made under an acceptable condition, foremost being that the account-holder has passed the age of 59½ (also, for general reference purposes, other acceptable conditions include that the taxpayer or an immediate family member is purchasing a first principal resident (and subject to a $10,000 lifetime limit), the taxpayer is experiencing long-term unemployment, or the taxpayer has died or is disabled). Also, with a Roth IRA, there is no required minimum distribution once the account-holder reaches age 70½. Assets can grow tax-free indefinitely.

The key difference therefore is, contributions to a standard form IRA are made with pre-tax dollars and hence reduce taxable income by the amount of the annual contribution, while contributions to a Roth IRA is made with after-tax dollars. And so while there are no current-year tax savings with contributions to a Roth IRA, distributions are tax-free and can grow tax free indefinitely even beyond age 70½. Distributions from a standard form IRA at retirement age are fully taxable as regular income and are subject to rules requiring minimum distributions.

It is recognized by the inventor hereof that taxpayers would desire when planning their retirement savings options, to compare how they would fare under the alternative forms of IRA. Indeed, special provisions permit existing standard from IRAs to be rolled over to Roth IRAs by taxpayers with adjusted gross income of less than $100,000. One consequence of rolling over a standard format IRA involves the payment of income tax and the penalty taxes, as well as any service fees of a financial planner. Given sufficient time, most taxpayers would do better rolling over their standard form IRA to a Roth IRA. However, rolling over a standard form IRA to a Roth form IRA is only advisable if the taxpayer lives longer than the break-even point. But the calculations for comparing various prospective outcomes in actual dollars, given various scenarios, get immensely complicated.

What is needed is a process for readily evaluating the financial consequences of converting a standard format IRA to a new Roth form IRA.

These and other aspects and objects are provided according to the invention in an process for evaluating the financial consequences of converting a standard format IRA to a new Roth form IRA. The process in accordance with the invention includes disclosing the substantial federal income tax consequences involved in converting the standard form IRA to the Roth form. The process further includes multiple options how a given IRA holder can manage the substantial tax consequences, including without limitation how he or she will fare if he or she obtains term insurance on the federal tax liability, or if he or she deducts the federal taxes and insurance premium from the rollover amount, or even the transaction fees from the rollover transaction. Other options included in the process according to the invention include disclosing financing options to finance the federal tax and insurance premium in order to preserve intact the entire IRA amount for rollover.

Additionally, the process according to the invention allows IRA holders to enter in estimated increases in federal tax rates in their retirement years. Whereas it is not known how the federal tax rates will change (if at all) in the ensuing years, the inventive process will allow entry of educated guesses so that the IRA holder can work through various chosen scenarios to see how he or she will fare under the chosen scenarios.

A number of additional features and objects will be apparent in connection with the following discussion of preferred embodiments and examples, including the disclosure of conveniently arranged video-style displays for self-explanatory entry of data and display of projected results based on the multiple various scenarios entered by a user of the process.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 10a shows a main dialog box for display on a video-style screen by a computer configured with a program in accordance with the invention, for evaluating the financial consequences of converting a standard form IRA to the Roth form IRA;

FIG. 10b is a partial view of the main dialog box of FIG. 10a, with portions broken away, and disclosing a change in the displayed values;

FIGS. 11a through 11c show a set of pop-up windows or dialog boxes which are accessed by buttons on the main dialog box of FIG. 10a; wherein:

FIG. 11a shows a window displaying case-specific, user-inputted marginal tax rates used in the calculations for evaluating the financial consequences of converting a standard form IRA to the Roth form IRA in accordance with the invention, FIG. 11b shows a dialog box that displays calculated future value results for alternatively investing the out-of-pocket expense involved in rollover (which was calculated and displayed by the FIG. 10a screen) for comparing how the out-of-pocket expense would fare if invested in an annuity having a 10 percent growth rate, and, FIG. 11c shows a dialog box that displays calculated finance options for the out-of-pocket expense involved in rollover (which was calculated and displayed by the FIG. 10a screen) for showing how to plan the financing of the out-of-pocket expense, including showing the projected interest which could be deductible to lessen income tax liability if properly financed; and, FIG. 12 shows an alternate version of the main dialog box relative to the previous version shown by FIG. 10a.

DETAILED DESCRIPTION OF THE PREFERRED EMBODIMENTS

Figure 1:
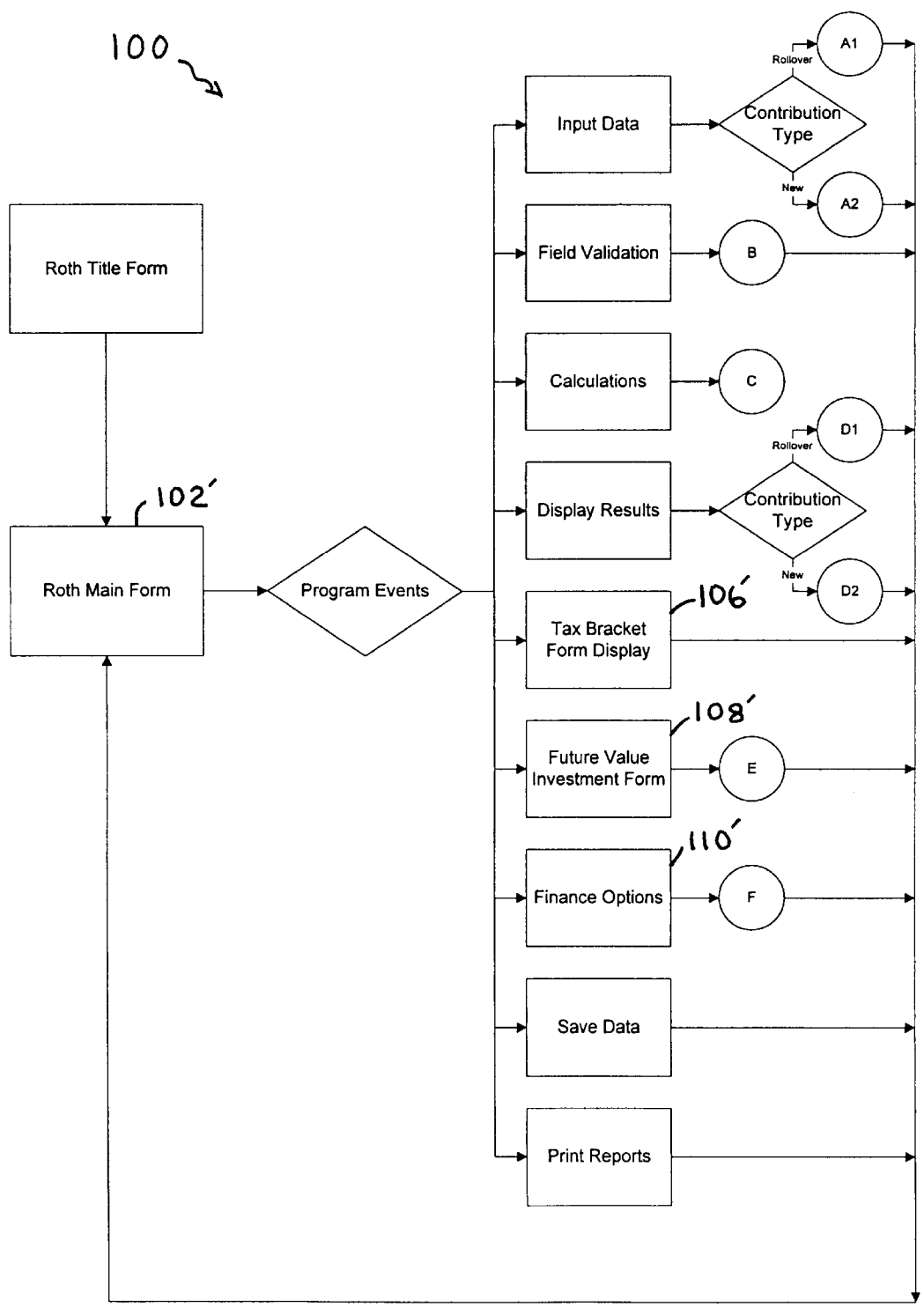
FIG. 1 is a flowchart giving an overview of the process in accordance with the invention, for evaluating the financial consequences of converting a standard form IRA to the Roth form IRA.

FIG. 1 shows a flowchart that gives a general overview of the objects in the process 100 in accordance with the invention, for evaluating the financial consequences of converting a standard form IRA to the Roth form IRA. The process 100 in accordance with the invention is ideally suited for the environment of and execution by a desktop, laptop, and/or personal computer. A source listing of a computer program that may be stored in computer memory, for executing the process 100 in accordance with the invention, is included herewith by way of non-limiting example in the APPENDIX appended hereto. The source listing is given in MICROSOFT® VISUAL BASIC® 5.0 format, for installation as an application program in the environment of a MICROSOFT® WINDOWS 95® operating system.

Figures 10A, 10B:
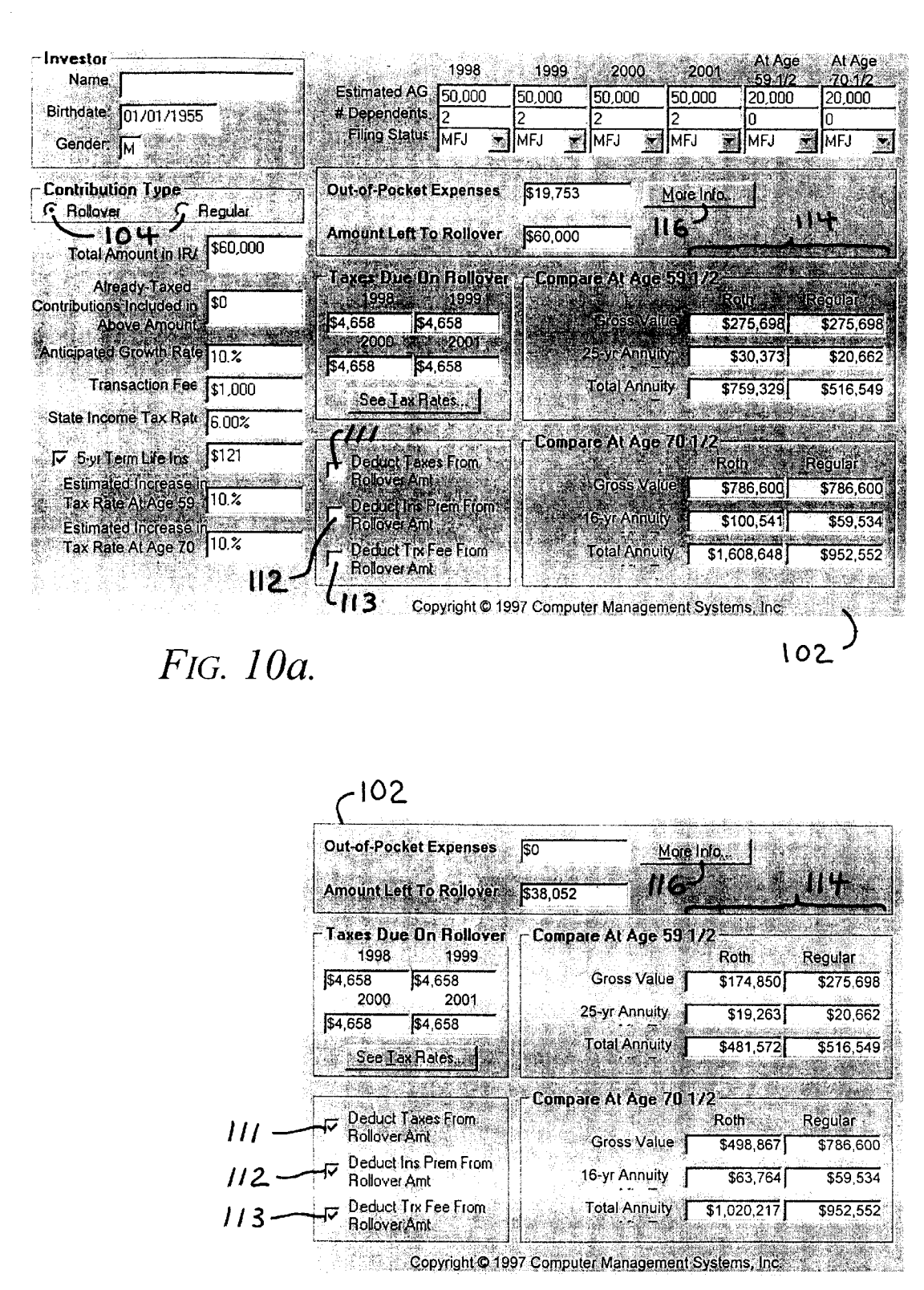
Figure 12:
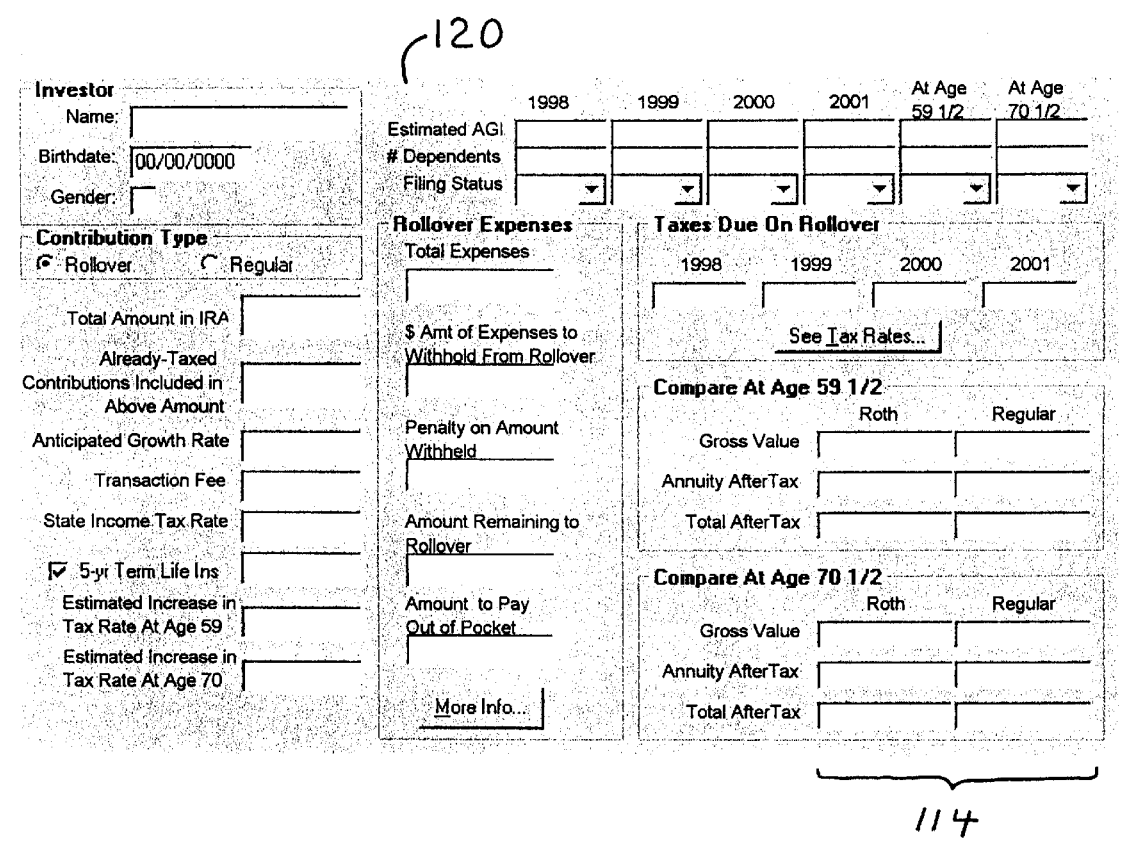

With reference to FIG. 1, the process 100 includes a main form 102', aspects of which are displayed on a suitable video-type screen to a user of the program via a main dialog box 102 or 120 as shown for example by the alternate versions in FIGS. 10a and 12, respectively. In this description, a conventional user of the program is assumed without limitation to be a service provider in the financial analysis industry. The conventional use of the program is to provide case-specific analysis for the financial planning of a given individual or couple who is or are presumed to be client(s) of the user. However, this conventional operative use environment of the process 100 in accordance with the invention is given by way of non-limiting example and does not exclude other arrangements including without limitation the end-user of the program entering his or her own case-specific financial information.

The main form/dialog box 102 allows entry of user-inputted variables for a case-specific analysis, and also includes display of calculated values that give the user the information he or she needs to evaluate the financial consequences for a given "client" (i.e., whether it be the user him or herself or another) of converting the client's standard form IRA to a Roth IRA.

Briefly, the flowchart of FIG. 1 shows program events as follows. The main form/dialog box 102 allows entry of user-inputted data according to the decision (entered via choosing the appropriate option button, indicated as 104 in FIG. 10a) to compare either (i) a rollover scenario, or (ii) the plainer scenario of establishing a new Roth IRA, without rollover. An inventive aspect of the process 100 in accordance with the invention is that aspect which allows detailed analysis of the decision whether to convert a standard form IRA to a Roth IRA, and as shown especially by FIGS. 2, 6, and 8 through 12. Hence this description shall concentrate on those aspects of the process 100. The workings of the process 100 as it relates to analyzing the establishment of a new Roth IRA—without rollover—as shown by FIGS. 3 and 7, will be routinely evident to persons having ordinary skill in the art once the rollover aspects of the process 100 have been described.

Figures 4, 8:
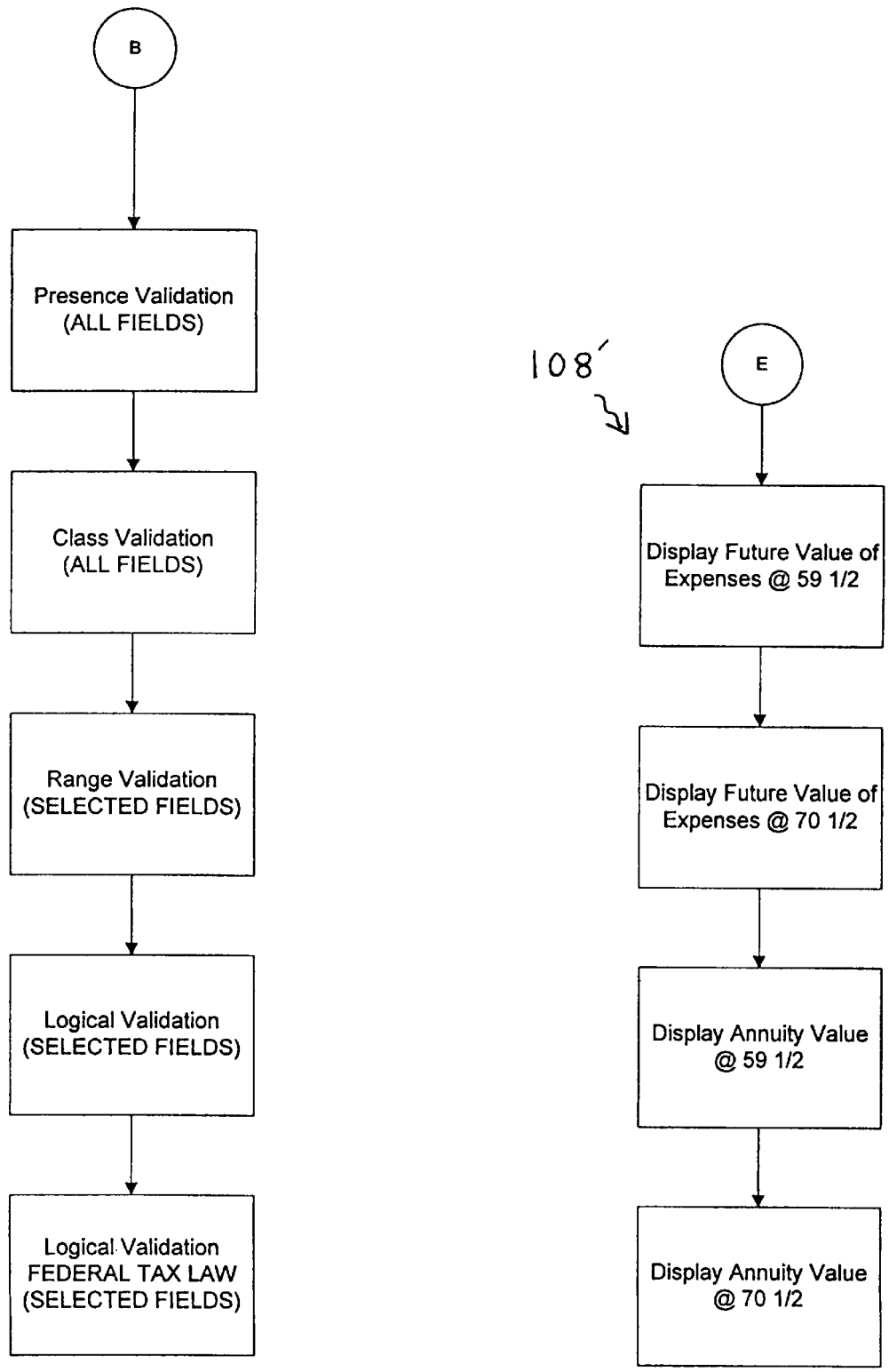
FIG. 4 is a continuation of the flowchart of FIG. 1, as extending from connecting block B therein.
FIG. 8 is a continuation of the flowchart of FIG. 1, as extending from connecting block E therein.
Figure 5:
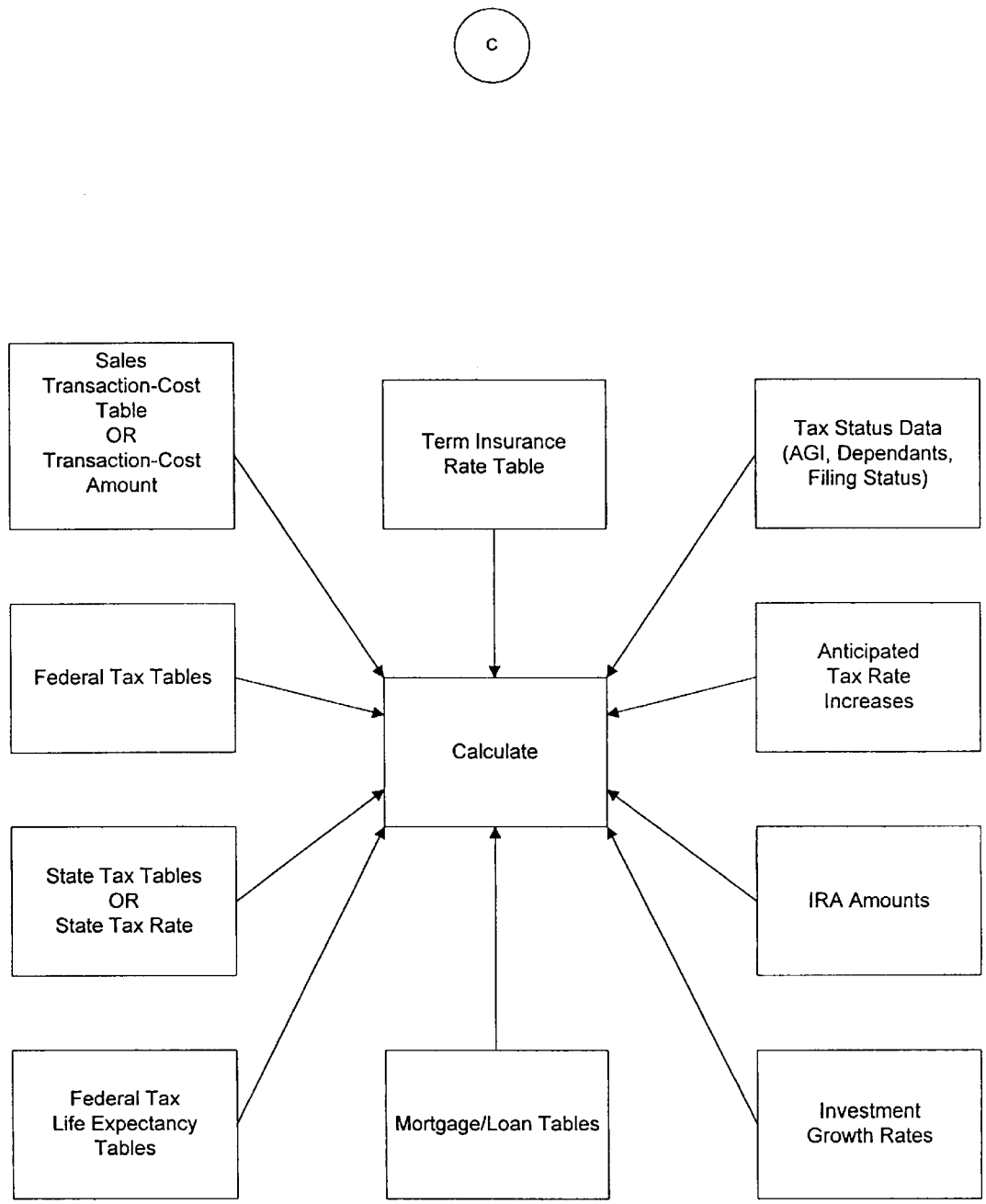
FIG. 5 is a continuation of the flowchart of FIG. 1, as extending from connecting block C therein.

The subject matter shown by FIGS. 4 and 5 is generally applicable to both uses of the process 100. That is, the process 100 includes performance of field validation checks on the inputted-data as shown by FIG. 4. Calculations are executed as will be discussed with reference to FIG. 5. The results are displayed pursuant to the decision or option button 104 (see FIG. 10a) chosen on the main form/dialog box 102, and as charted by FIGS. 6 and 7. The user-inputted tax brackets can be displayed by a pop-up box 106 shown by FIG. 11a (indicated as process box 106' in FIG. 1).

Among other inventive aspects hereof, one inventive aspect involves the future value investment form 108' or pop-up dialog box 108 as shown by FIGS. 8 and 11b. Another inventive aspect involves the finance options form 110' or pop-up dialog box 110 shown by FIGS. 9 and 11c. Additionally, the main program events include saving the data and results as well as generating and printing reports for an easily interpretable hard copy of data and results, which is conventional.

Figure 2:
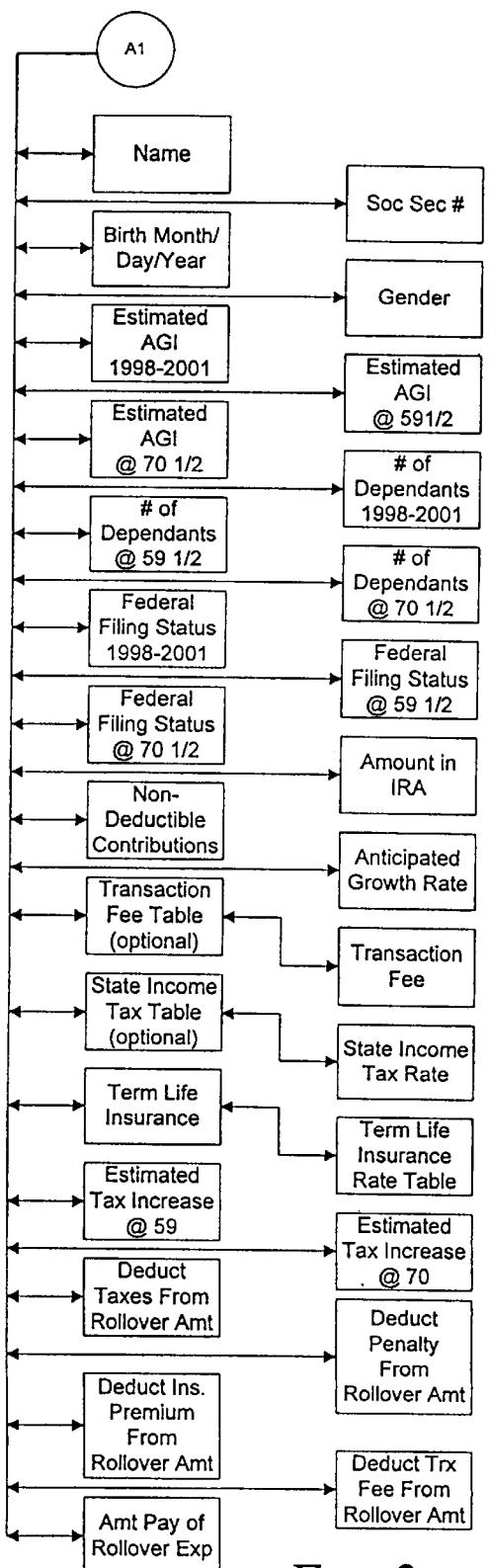
FIG. 2 is a continuation of the flowchart of FIG. 1, as extending from connecting block A1 therein.
Figure 3:
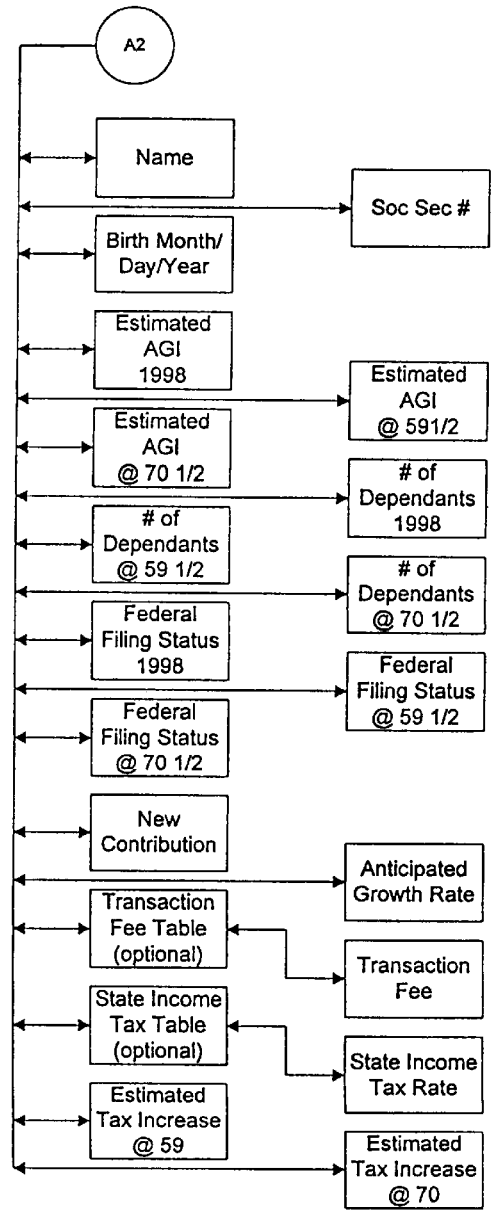
FIG. 3 is a continuation of the flowchart of FIG. 1, as extending from connecting block A2 therein.

With renewed reference to FIGS. 2 and 10a, the main form/dialog 102 box allows entry of the following case-specific values. The user inputs the following items including the client's name, social security number (for record identification on "save" at the end of the session), birth date, gender, estimated Annual Gross Income (hereinafter, "AGI") for the years 1998 through 2001, estimated AGI at age 59½ and 70½, and number of client's dependents and filing status for the foregoing tax years. Also, the user inputs the client's "Total Amount" to date held in a standard form IRA, the non-deductible contributions within that "Total Amount," the anticipated growth rate, a transaction fee which will be explained more fully below, a state income tax rate, a check (or not) in a check box whether to insure the cost of rollover with 5-year term life insurance, and estimations (if any) of increases in the federal tax rates at ages 59½ and 70½. The main form/dialog box 102 furthermore includes a series of three check boxes 111–113 respectively for such decisions as (i) whether to deduct the income taxes from the rollover amount, (ii) whether to deduct the insurance premium, and/or (iii) whether to deduct the transaction fee from the rollover amount. Penalty taxes, if applicable, will be included in the deductions. The foregoing data entries will all be explained more particularly below in connection with an example that is illustrated by FIG. 10a through 11c.

The final option shown by FIG. 2 is a decision on what fractional amount of the rollover expenses shall be paid versus financing the remainder. This final option encompasses an alternate version of the main dialog box, which alternate dialog box 120 is shown by FIG. 12. As far as FIG. 10a dialog box 102 is concerned, the client is given the choice of either (i) paying all of the out-of-pocket rollover expenses, or (ii) deducting all of any of the three categories 111–113 of the out-of-pocket rollover expenses from the rollover amount. Again, the these three categories are:—(1) the check box 111 for deduction of income and penalty (if any) taxes, (2) the check box 112 for deduction of the premium for the 5-year term life insurance, and (3) the check box 113 for deduction of the transaction fee(s) charged by a financial service provider such IRA-account provider or a financial planner and the like.

The alternate version of the dialog box 120 in FIG. 12 allows the possibility of fractionally partitioning the out-of-pocket rollover expenses, wherein some portion is paid while the remainder portion is deducted from the rollover amount. Put differently, the FIG. 10a dialog box 102 gives only all-or-nothing choices 111–113 on what to deduct from the rollover amount, and these kinds of choices are believed sufficient for a client having low- or moderate-sized IRA accounts. The FIG. 12 version 120 is more broadly tailored for client's who have "substantial" sums in IRA accounts. While the term "substantial" is relative and hardly self-defining, any prospective client having an IRA sum in excess of $300,00 and earns less than $100,000 annual income in order to qualify under the tax laws for rollover, can be reckoned as having "substantial" sum(s) in IRA savings.

Thus, if the user has properly entered the data specific to a given client, then the program is set for validating the data and calculating and displaying results.

FIG. 4 shows the field validation scheme used by the process 100 in accordance with the invention, to give the user feedback on certain detectable errors. The validations include validating whether an entry is present in all required fields, whether the entered value belongs to the appropriate class (e.g., numeric, alphabetic, alpha-numeric and so on), whether the range of the entry is appropriate in selected fields (e.g., whether the "State Income Tax Rate" is less than 100 percent), whether there is an illogical entry (e.g., whether the value for "Already Taxed Contributions included in Above Amount" is greater than "Total Amount in IRA"), as well as validating other logical conditions, including for example whether the client has too great of an AGI to qualify for rollover under the federal laws.

FIG. 5 shows the calculation process box and the data it accesses to calculate the values given by the process 100 in accordance with the invention. Some of the accessed values are data entered by the user. Other values are extracted from pre-installed databases. The user-inputted data includes client-specific tax status data, IRA amount(s), investment growth rates, anticipated tax rate increase and so on. Optional user-inputted data includes a state tax rate and sales transaction cost. In the example given below, the client is assumed to be a Missouri resident and so in FIG. 10a the applicable state tax rate is entered as "6 percent." However, it would be possible for Missouri (and other states as well) that the applicable tax rates be pre-installed in a database which the program could access for look-up values as appropriate. Also, in FIG. 10a, there is a given transaction fee entered in the amount of "$1,000." This represents the fee charges of a financial-planner/service-provider who would presumptively handle the account of the client and be responsible for conversion of the standard form IRA to the Roth form IRA, as well as handle or sell the other financial products involved, such as term life insurance or loan packaging and so on. Alternatively, an institutional user of the program could set-up a menu of transaction fees in a database which the program could access on a look-up basis, for applying a more accurate estimate of the transaction fees, as dependent on the actual services projected to be provided.

The following databases are preferably pre-installed for access by the program, to extract the applicable values. These databases would preferably include the federal tax tables, federal tax life expectancy tables, term insurance rate tables, and mortgage/loan tables, all which are conventional and are not part of the invention other than being accessible for providing input values for the calculations.

Figure 6:
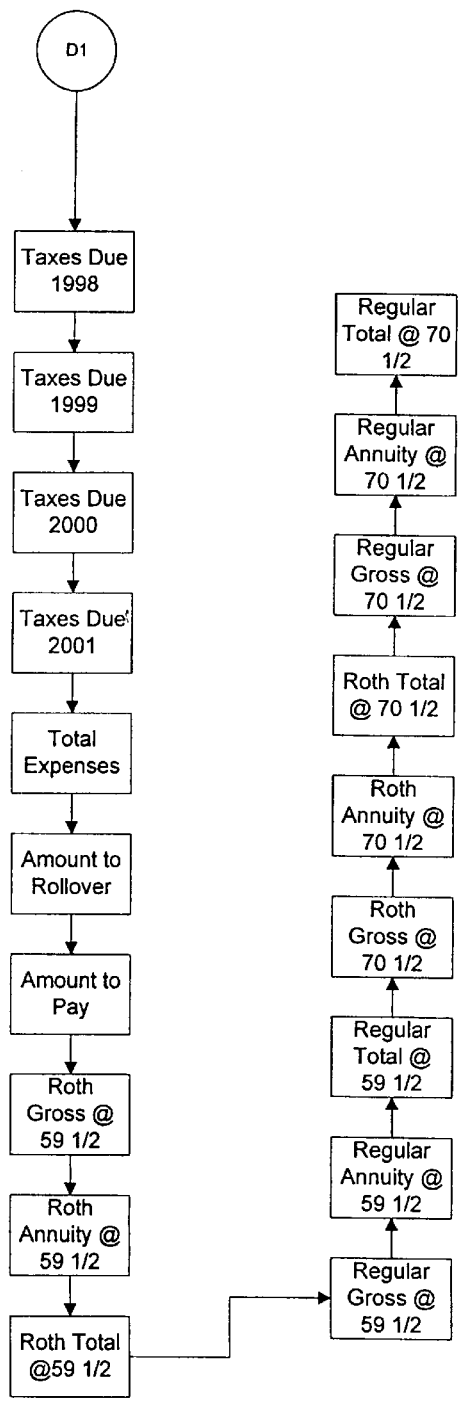
FIG. 6 is a continuation of the flowchart of FIG. 1, as extending from connecting block D1 therein.
Figure 7:
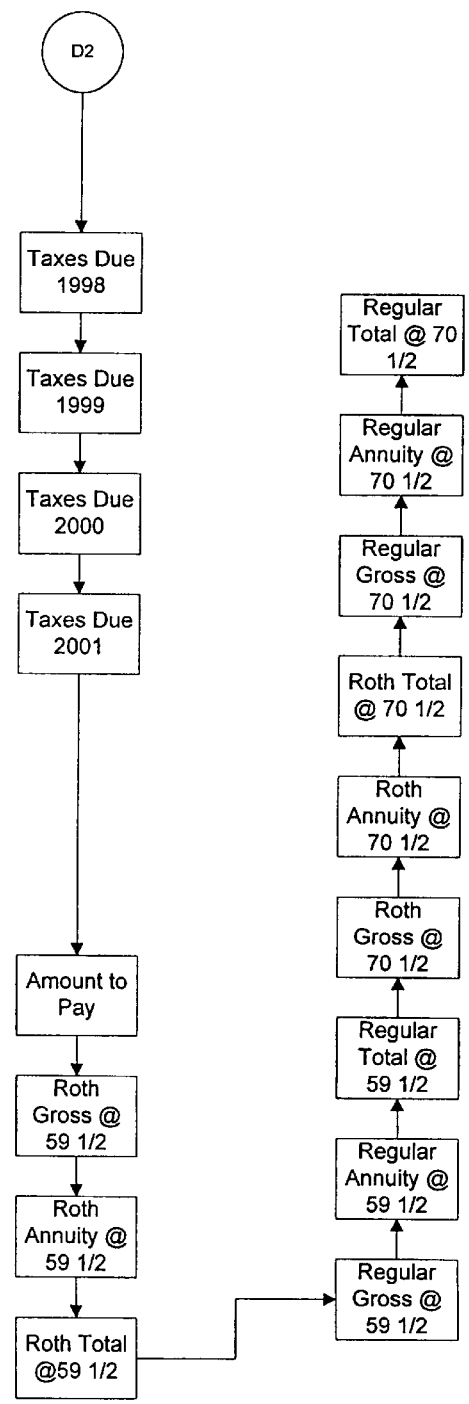
FIG. 7 is a continuation of the flowchart of FIG. 1, as extending from connecting block D2 therein.

FIG. 6 shows the objects of the display of the calculated results. These include taxes due in the years 1998 through 2001, the total of out-of-pocket expenses (or amount to pay), the amount left to rollover, then a comparison of the client's financial consequences at ages 59½ and 70½, and in a two column table (indicated as 114 in FIGS. 10a, 10b and 12) the key results for distinguishing performance of a standard form IRA versus a Roth form IRA. Two column table 114 gives the results (for both IRA forms) in terms of the gross value of the IRA, the after-tax annual distribution amount (assuming a 25-year annuity if distributions begin at age 59½ and a 16 year annuity if distributions begin at age 70½), and the total corresponding after-tax annuity value.

The foregoing objects may readily be clarified by use of an example, as given next. With reference to FIG. 10a, an example client has been chosen who is a baby-boomer born in 1955, is male, and has a total amount in standard form IRA(s) of $60,000. His estimated AGI for the tax years 1998 through 2001 is $50,000 per year. He estimates his income at age 59½ and 70½ —derivable from sources other than his IRA (i.e., he excludes prospective IRA income from the estimates)—to be about $20,000 annually at both ages. Such income could be a combination of other retirement income including social security and so on. Furthermore, the client has two dependents for the tax years 1998 through 2001, but he presumes that since they will reach majority by his ages 59½ and 70½, they will likely have their own independent filing status and hence give him no dependents for tax purposes then. His tax filing status is assumed consistently to remain as Married Filing Jointly throughout.

Continuing with the example, the given client here has "zero" entered for his "already taxed contributions" in his total IRA amount of $60,000. He anticipates a growth rate of 10 percent, presumably based on history. The example client expects to pay a financial planner a transaction fee of $1,000 for handling the conversion of the IRA from standard form to Roth form, and perhaps this fee will also cover other financial products such as term life insurance or loan packaging and so on. As previously indicated, the example client is a resident of Missouri, where he pays state taxes at a 6 percent rate.

A check box is included for 5-year term life insurance. The cost of converting a standard form IRA to the Roth form includes at least the following items:—(i) the income tax on the earnings, and, (ii) the fractional portion of the contributions which have not been previously taxed (e.g., in the example, however, all of it is taxable or the full $60,000 amount). The Taxpayer Relief Act of 1997 allows any taxpayer converting standard IRA's to Roth IRA's in the tax year 1998, the option of averaging the income tax over four tax years, namely 1998 through 2001. The option of four-year averaging won't be available for those who choose to convert in 1999, 2000, or 2001. In those years taxpayers will have to pay the full tax liability in the given tax year. And the window of opportunity to convert a standard form IRA to a Roth IRA, only exists for the years 1998 through 2001. After 2001, there will no longer be an option to convert. Also, if a holder of a Roth IRA which is funded by converting a standard form IRA dies within five years from the date of conversion, the holder's estate will be subject to a 10 percent penalty on applicable sums that were originally derived from the standard IRA as "non-qualified" early withdrawals under the tax rules for the standard form IRA. The holder would be advised to get insurance to protect his estate from this risk by securing 5-year term life insurance in case he doesn't survive the five years. By inserting a check in the check box, the example client decided in favor of 5-year term life insurance. The program calculates a premium of $121 to pay, in full, for the term insurance coverage.

The next series of inputs require some speculation on the part of the example client, as well on the part of his financial adviser(s). In recent history, federal tax rates were subject to much change and in fact cyclically swung between allocating greater and lesser relative burdens on higher bracket taxpayers. Currently, the tax rates are perhaps moderately favorable to higher bracket taxpayers, but in the future the pendulum may swing back to imposition of relatively severer tax burdens. The next two inputs invite the client and/or the user to speculate what will transpire by the time the client reaches ages 59½ and 70½. In the example of FIG. 10a, the values of 10 percent have been entered in both boxes. The calculated tax rates are displayable by the pop-up window 106 (see FIG. 11a) accessible through the "More Info. . . " button 116 on the FIG. 10a screen 102. This pop-up window 106 is shown by FIG. 11a, which shows the marginal federal tax rates applicable to the example here as 28 percent for the tax years 1998 through 2001, with a jump to 38 percent when the 1955-born example client reaches age 59, and 41 percent when he reaches age 70.

With reference back to FIG. 10a, this example scenario is completed by the decision to leave unchecked the three boxes 111–113 nominally entitled (i) "Deduct Taxes from Rollover Amount," (ii) "Deduct Insurance Premium from Rollover Amount," and (iii) "Deduct Transaction Fee from Rollover Amount," respectively.

Given the foregoing inputs, the results are calculated and displayed as explained next. The client's income taxes due on the $60,000 IRA conversion in each of the years of 1998 through 2001 is $4,658. His sum total out-of-pocket expenses for rollover is the amount $19,753:—which is the sum of income taxes (4 years×$4,658 in yearly taxes)+$1,000 transaction fee+$121 insurance premium. The client taxpayer has elected to pay the entire $19,753 with resources other than the IRA amount of $60,000, which thus allows him to rollover the entire $60,000 amount.

At age 59½, his IRA will grow to a gross value of $275,698 regardless if in a standard form IRA or Roth IRA. If he elects to begin distributions of his standard form IRA at age 59½, he must do so according to the federal tax laws by treating it as a 25-year term annuity. This gives him an after-tax annual distribution amount from his standard form IRA of $20,662 per year, for a total after-tax annuity value under the standard form IRA plan of $516,549. For comparison, under the Roth format IRA, an equivalent 25-year term annuity annual distribution is a tax-free $30,373 per year, which is an increase of about $10,000 annually since all of the distribution of the Roth IRA is tax-free. The total tax-free plan value of a Roth form IRA distributed from age 59½ in accordance with a 25-year term annuity scheme, is $759,329.

Thus the example client effectively improves his IRA retirement picture by $242,780 if he converts his standard form IRA to a Roth form IRA. Put differently, if the 1955-born example client is willing to incur less than a $20,000 present out-of-pocket liability, he will effectively improve his IRA retirement picture by nearly a quarter million dollars by age 59½. Thus the calculated values, given the foregoing assumptions, heavily favor the decision to convert.

Furthermore, if he compares how he will look if he were to put off distributing from his Roth form IRA until 70½ (which is as late as federal tax law will allow him to delay on a standard form IRA), he will look better still. His total value of a Roth form IRA distributed as a 16-year term annuity will give an annual tax-free distribution amount of $100,541, for a total tax-free plan value of $1,608,648. Whereas, the standard form IRA will yield—if distributed as a 16-year term annuity—merely an annual after-tax distribution amount of $59,534, for a after-tax total plan value of $952,552. Under this scenario, the 1955-born example client will gain—for less than a $20,000 present out-of-pocket liability—an improvement in his effective IRA retirement savings at age 70½, by better than a half million dollars.

Thus if the example client is of the notion to leave his IRA saving untouched until as late as age 70½, the calculated values even more heavily weigh in favor of the decision to convert.

Among other inventive aspects of the process 100 in accordance with the invention, is the inventive aspect that it allows comparison with how the example client would have fared if he had not incurred the out-of-pocket expense of $19,753, and instead would have invested that sum in a simple annuity for distribution at ages 59 and 70, respectively, at annual distribution rates of a 25-year term and 16-year term annuity, respectively.

This is accomplished, as shown by FIG. 1, a "Future Value Investment Form" 108' (and attendant dialog box 108 as shown by FIG. 11b). The FIG. 11b dialog box 108 is accessed from the main dialog box 102 of FIG. 10a, by the "More Info. . ." button 116. The object processes associated with this portion of the program that display the results as shown by FIG. 11b, are flowcharted in FIG. 8. In general, with reference to FIG. 11b, the user enters the value $19,753 in the "Total Amount" box, and the remaining values are calculated and displayed in accordance with FIGS. 5 and 8. The growth rate is assumed 10 percent.

The calculated values shown by FIG. 11b are interpretable as follows, with relation back to the values shown by screen FIG. 10a. In FIG. 11b, the pre-tax gross value of the annuity at age 59½ would have grown to $79,780, which would yield an annual after-tax distribution of $6,065 on a 25-year term annuity basis. So, if this after-tax $6,065 value is added to the after-tax $20,662 annual value for the standard form IRA, the example client will have fared worse than if he had converted his standard form IRA to a Roth IRA and paid the $19,753 out-of-pocket expenses, for which he would have gotten a tax-free $30,373 annual distribution.

In other words, he effectively loses $3,646 of tax-free income a year (i.e., $30,373–$20,662–$6,065) if he does not convert to a Roth form IRA and instead merely invests the out-of-pocket expenses of $19,753 in an annuity.

Over 25 years, the total loss amounts to $91,150 (i.e., the tax-free $759,329 total value of the Roth IRA—$516,549 total after-tax value of the standard form IRA—$151,615 total after-tax value of the annuity) for the mistake of not properly choosing to convert to the Standard form IRA and incurring the $19,753 liability of out-of-pocket expenses in the conversion. The values at age 70½ merely widen the gap between the relatively wiser choice of converting to a Roth IRA and the relatively poorer choice of not.

Whereas the two scenarios shown to date favor conversion to the Roth IRA for the 1955-born example client, realism requires addressing the matter of the out-of-pocket expenses in more detail. The value to date has been shown by the example to be $19,753. In practical terms, the average taxpayer earning $50,000 per year with two dependents may be deterred from willingly incurring a $19,753 liability. The client may simply have a hard time coming by the resources to pay it.

The process 100 in accordance with the invention allows evaluation of how the subject client would fare if he either (i) deducted the rollover expenses from his IRA sum, or (ii) if he financed the rollover expenses by alternative financing options. The first of these two options shall be taken up next with the following description of FIGS. 2 and 10b.

FIG. 10b is a partial view of the screen of FIG. 10a, except that it displays changed inputs and the resultant changes in displayed outputs. In FIG. 10b, the user has checked off the appropriate check boxes 111–113 to cause the program to deduct the rollover expenses from the Total Amount in IRA before rollover. More particularly, the following check boxes 111–113 have been checked off:—(i) the "Deduct taxes from Rollover Amount" check box, (ii) the "Deduct Insurance Premium from Rollover Amount" check box, and (iii) the "Deduct Transaction Fee from Rollover Amount" check box, 111–113, respectively.

From the previous discussion of the example above, these values includes at least the following amounts:—4 years× $4,658 averaged annual income taxes, plus $121 premium for 5-year term life insurance, plus $1,000 transaction fee, for a sum of $19,753.

Also, since the sum $19,753 is to be deducted from the $60,000 rollover amount, the client will have to pay a tax-law imposed 10 percent penalty on a non-qualified early distribution of his rollover amount. Hence 10 percent of $19,753 is $1,975. And, increasing the deduction amount of $19,753 by a step increase of $1,975 requires paying a 10 percent penalty on that step increase, i.e., an additional $197 in penalty. And moreover, increasing the deduction amount of ($19,753+$1,975) by a second step increase of $197 requires paying a 10 percent penalty on that second step increase, i.e., a further $19, and so on, recursively, until the compounding of the 10 percent penalty amount on the base value of $19,753 can be calculated as follows:—$19,753× 11.111. . . percent.

Accordingly, the calculated value "Amount Left to Rollover" is computed as follows:—$60,000–$19,753– (11.1111%×$19,753), which equals $38,052. The corresponding value of "Out-of-Pocket Expenses" is zero because the full expense of rollover in its entirety has been deducted from the rollover amount.

Therefore, given an amount of $38,053 after deductions to rollover into a Roth form IRA, FIG. 10b displays how the client will fare against having done nothing with his standard form IRA. As the two column table 114 in the lower right corner of FIG. 10b shows, the client does not effectively improve his retirement picture. The rollover of $38,052 in a Roth IRA is projected to yield at age 59½ simply an annual tax-free distribution on a 25-year annuity basis of $19,263, compared to the standard form IRA annual after-tax distribution of $20,662. Likewise, at age 70½, the rollover of $38,052 in the Roth IRA is projected to yield an annual tax-free distribution on a 16-year annuity basis of $63,764, compared to the standard form IRA annual after-tax distribution of $59,534. Accordingly, the calculated values do not counsel in favor of a change.

Therefore, if the client wishes to reap the benefits of the Roth IRA projected by the values of FIG. 10a and shown in table 114, he is wise to pay the rollover expenses rather than deduct the rollover expenses from his IRA amount. An inventive aspect of the process 100 in accordance with the invention is that it allows the client to evaluate how he will fare if he finances the rollover expense of $19,753 with a loan.

Figure 9:
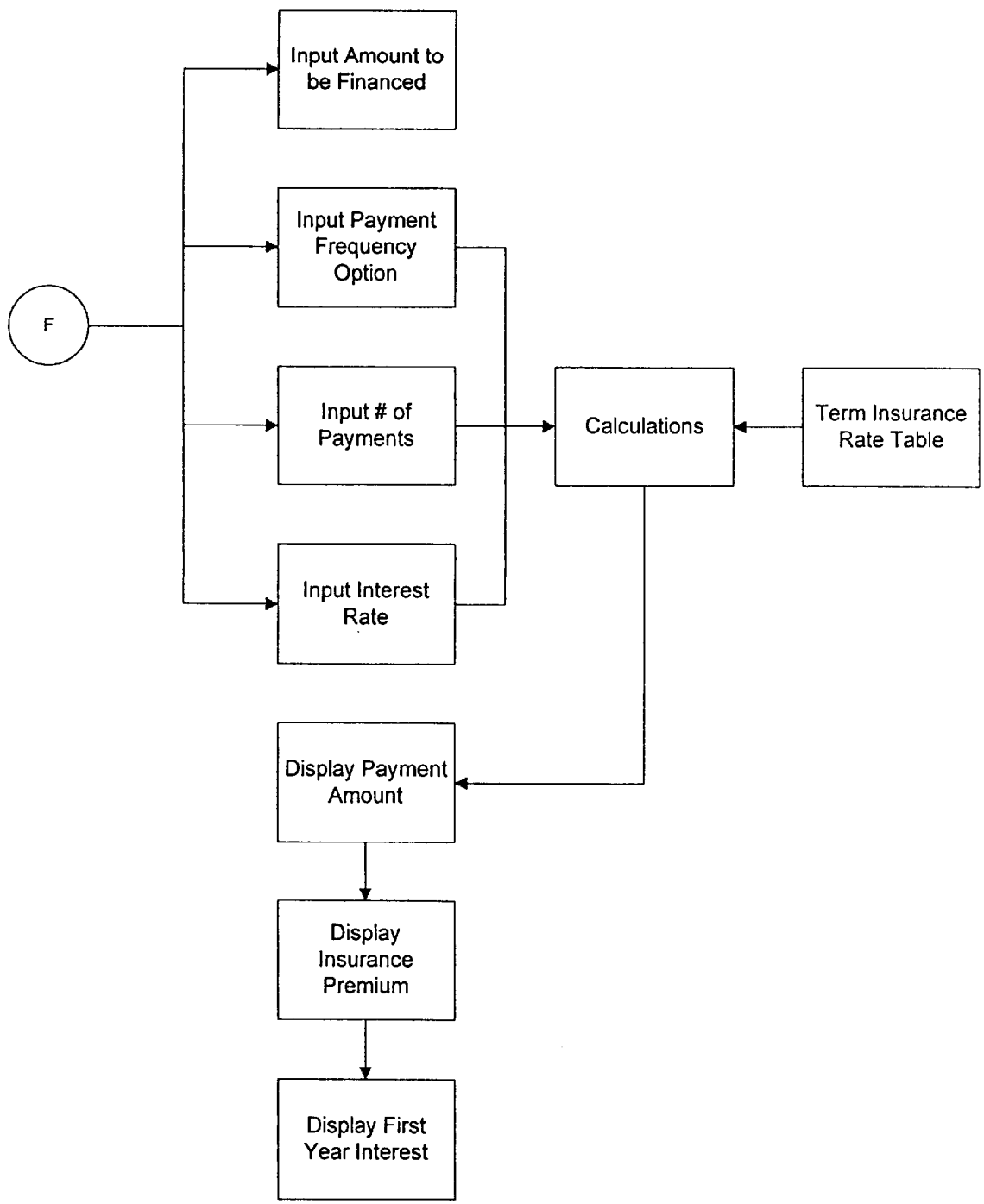
FIG. 9 is a continuation of the flowchart of FIG. 1, as extending from connecting block F therein.

This aspect of the process 100 in accordance with the invention is accomplished as shown by the process box 110' in FIG. 1, which is flowcharted in FIG. 9, and the dialog box 110 in FIG. 11c.

With reference to FIG. 11c, the user inputs the following information into the appropriate boxes, as follows. In the "Amount to Finance" box the user has inputted the full rollover expense of $19,750. The user has selected the button option of "Monthly" for payment options, and has chosen a ten year loan term which needless to say would equal 120 monthly payments, and financed at an interest rate of 9½ percent. The remaining values are calculated and displayed in accordance with the flowcharts of FIGS. 9 and 5. The results are interpretable as follows.

The example client will be liable for a monthly payment of $256 to finance the rollover expense. His total cost of financing over the life of the loan will be $30,667. He is advised to purchase 10-year term life insurance to cover the possibility he does not survive the term of the loan, and if he does, the first year premium will amount to $55 (this yearly premium will increase with age). The approximate amount of the interest portion of the first year's payments is displayed as $1,823. This amount is potentially deductible from the client's income if the financing is arranged properly. For example, the client could take a second mortgage on his principal residence, and then the interest payments would qualify for deduction.

What these calculated values tell the client, in conjunction with the projected earnings of the Roth IRA as shown by table 114 in FIG. 10*a*, is that he ought to rollover into a Roth IRA and finance the rollover expense. If he finances the rollover with a total finance package of $30,667 spread across ten years, portions of which ought to be deductible from his income, he will improve his IRA retirement savings by effectively a quarter million dollars by age 59½, and possibly by more than a half million dollars if he is willing to put off withdrawing from the Roth IRA account until age 70½.

The foregoing example and the proceedings through each of the screens advises in favor of this 1955-born example client converting his standard form IRA to a Roth form IRA, whether he has to finance the rollover expenses or else if he can presently pay it without financing.

If given a different set of circumstances, the process 100 in accordance with the invention may advise against rollover. Other individuals, especially those nearer in age to 59½, would probably not be advised to convert their standard form IRA's. To find out, each individual ought to work through the process 100 in accordance with the invention to see how he or she will fare under his or her circumstances.

While this process 100 in accordance with the invention has obvious advantages for the holder of the IRA who has variously been termed herein as "client," "taxpayer," or "holder," this process 100 provides multiple advantages for a professional financial planner as well. More particularly, professional service-providers of this type are prohibited by law from handling a transaction such as converting a given standard form IRA into another standard form IRA. This is prohibited by law, evidently, as a pernicious form of account churning that does not confer any financial benefit onto the client. However, a professional service-provider shall be lawfully allowed to handle a rollover transaction converting a standard form IRA to a Roth form IRA. Indeed, as the example given above shows, this transaction in given cases can confer substantial benefit to the client. Hence, the process 100 in accordance with invention is a useful tool for the service provider to explain the advantages of one type of financial product he or she sells, namely, the Roth form IRA.

Also, the contingency of whether conversion will ultimately pay dividends depends partly on whether the client lives past the break even point. As previously discussed, the client is advised to consider insurance to cover the liability he will incur in case he does not survive past the date when the liability has been extinguished. Therefore, the process and program in accordance with the invention allows the professional service-provider to sell supplementary financial products to the client in the rollover transaction, including 5-year term life insurance to cover a prospective penalty tax liability and 10-year term life insurance to cover the financing package if the rollover expense is financed. Furthermore, the professional service-provider may have an opportunity to sell a fourth financial product, which namely is the loan or second home-mortgage to finance the rollover expense.

The dialog box 102 of FIG. 10*a* is arranged to allow a given client to see how he or she will fare if none of the rollover expenses are deducted from the rollover amount (i.e., FIG. 10*a*) or if all of the rollover expenses are (i.e., FIG. 10*b*). It is of course another kind of option for the client to consider if he or she would rather deduct some portion of the rollover expenses from the rollover amount, and pay the rest. This is accomplished by the dialog box 120 shown in FIG. 12. No example shall be given for use of the FIG. 12 dialog box 120 as its use and functions follows routinely from everything described above, and from the vantage point of a person having ordinary skill in the art.

Accordingly, the invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A computer-implemented process for evaluating for an IRA holder the financial consequences of converting a standard form IRA to a Roth form IRA, comprising the steps of:

one of receiving federal tax information and extracting federal tax information from a database;

receiving personal information about the IRA holder including a given IRA amount for evaluation and the preliminary specification of at least one given year between ages 59 and 71 in which the holder opts to begin IRA distributions;

one of receiving state tax information and extracting state tax information from a database;

processing the information for the financial consequences of converting the given IRA amount from a standard form IRA to a Roth form IRA by generating and displaying (i) the federal income tax consequences of conversion, and, for comparison, (ii) one of (a) an after-tax annual distribution amount projected for the standard form IRA on an appropriate annuity term basis governed by federal tax information at the given year the holder begins distributions, or (b) an after-tax total annuity value thereof, against, (iii) correspondingly, one of (a) an annual distribution amount projected for the Roth form IRA on the same annuity basis, or the total annuity value of the projected Roth form IRA;

determining a reduced given-IRA amount by deducting from the given IRA amount the federal tax consequences of conversion;

processing the information for the financial consequences of converting the reduced given-IRA amount from a standard form IRA to a Roth form IRA by generating and displaying for comparison (i) one of (a) an after-tax annual distribution amount projected for the standard form IRA on an appropriate annuity term basis governed by federal tax information at the given year the holder begins distributions, or (b) an after-tax total annuity value thereof, against, (ii) correspondingly, one of (a) an annual distribution amount projected for the Roth form IRA on the same annuity basis, or (b) the total annuity value of the projected Roth form IRA; and, receiving information of a transaction fee for such a transaction as converting the standard form IRA to a Roth form IRA;

one of receiving term insurance rate information and extracting term insurance rate information from a database;

determining and displaying a premium for term insurance to cover a liability comparable to the federal income tax consequences of conversion; and, at the instance of the step of determining a reduced given-IRA amount, further determining the reduced given-IRA amount by deducting further from the given IRA amount one of (i) the transaction fee, (ii) the premium for the term insurance, and (iii) both the transaction fee and the premium for the insurance.

2. The computer-implemented process of claim 1 further comprising:

one of receiving loan/mortgage rate information and extracting loan/mortgage rate information from a database;

processing financing options for a finance amount comparable to "the given IRA amount" less "the reduced-given IRA amount" by, receiving information on payment options, finance term, and interest rate, and generating and displaying a payment amount and an interest portion of the payment amount.

3. A computer-implemented process for evaluating for an IRA holder the financial consequences of converting a standard form IRA to a Roth form IRA, comprising the steps of:

one of receiving federal tax information and extracting federal tax information from a database;

receiving personal information about the IRA holder including a given IRA amount for evaluation and the preliminary specification of at least one given year between ages 59 and 71 in which the holder opts to begin IRA distributions;

one of receiving state tax information and extracting state tax information from a database;

processing the information for the financial consequences of converting the given IRA amount from a standard form IRA to a Roth form IRA by generating and displaying (i) the federal income tax consequences of conversion, and, for comparison, (ii) one of (a) an after-tax annual distribution amount projected for the standard form IRA on an appropriate annuity term basis governed by federal tax information at the given year the holder begins distributions, or (b) an after-tax total annuity value thereof, against, (iii) correspondingly, one of (a) an annual distribution amount projected for the Roth form IRA on the same annuity basis, or (b) the total annuity value of the projected Roth form IRA;

determining a reduced given-IRA amount by deducting from the given IRA amount the federal tax consequences of conversion;

processing the information for the financial consequences of converting the reduced given-IRA amount from a standard form IRA to a Roth form IRA by generating and displaying for comparison (i) one of (a) an after-tax annual distribution amount projected for the standard form IRA on an appropriate annuity term basis governed by federal tax information at the given year the holder begins distributions, or (b) an after-tax total annuity value thereof, against, (ii) correspondingly, one of (a) an annual distribution amount projected for the Roth form IRA on the same annuity basis, or (b) the total annuity value of the projected Roth form IRA; and, processing an investment option for an investment amount comparable to "the given IRA amount" less "the reduced-given IRA amount" by, generating and displaying (i) one of (a) an after-tax annual distribution amount projected for investment amount on the same annuity term basis as for the standard form IRA governed by federal tax information and at the given year the holder begins distributions, or (b) a total after-tax annuity value of the investment.

4. A computer-implemented process for evaluating for an IRA holder the financial consequences of converting a standard form IRA to a Roth form IRA, comprising the steps of:

one of receiving federal tax information and extracting federal tax information from a database;

receiving personal information about the IRA holder including a given IRA amount for evaluation and the preliminary specification of at least one given year between ages 59 and 71 in which the holder opts to begin IRA distributions;

one of receiving state tax information and extracting state tax information from a database;

processing the information for the financial consequences of converting the given IRA amount from a standard form IRA to a Roth form IRA by generating and displaying (i) the federal income tax consequences of conversion, and, for comparison, (ii) one of (a) an after-tax annual distribution amount projected for the standard form IRA on an appropriate annuity term basis governed by federal tax information at the given year the holder begins distributions, or (b) an after-tax total annuity value thereof, against, (iii) correspondingly, one of (a) an annual distribution amount projected for the Roth form IRA on the same annuity basis, or (b) the total annuity value of the projected Roth form IRA;

wherein the step of one of receiving federal tax information and extracting federal tax information from a database, further includes one of receiving or extracting such federal tax information as a "zero" tax rate.

5. A computer-implemented process for evaluating for an IRA holder the financial consequences of converting a standard form IRA to a Roth form IRA, comprising the steps of:

one of receiving federal tax information and extracting federal tax information from a database;

receiving personal information about the IRA holder including a given IRA amount for evaluation and the preliminary specification of at least one given year between ages 59 and 71 in which the holder opts to begin IRA distributions;

one of receiving state tax information and extracting state tax information from a database;

processing the information for the financial consequences of converting the given IRA amount from a standard form IRA to a Roth form IRA by generating and displaying (i) the federal income tax consequences of conversion, and, for comparison, (ii) one of (a) an after-tax annual distribution amount projected for the standard form IRA on an appropriate annuity term basis governed by federal tax information at the given year the holder begins distributions, or (b) an after-tax total annuity value thereof, against, (iii) correspondingly, one of (a) an annual distribution amount projected for the Roth form IRA on the same annuity basis, or (b) the total annuity value of the projected Roth form IRA;

wherein the step of one of receiving state tax information and extracting state tax information from a database, further includes one of receiving or extracting such state tax information as a "zero" tax rate.

6. The computer-implemented process of claim 5 further comprising:

determining a reduced given-IRA amount by deducting from the given IRA amount a fractional portion of the federal tax consequences of conversion; and processing the information for the financial consequences of converting the reduced given-IRA amount from a standard form IRA to a Roth form IRA by generating and displaying for comparison (i) one of (a) an after-tax annual distribution amount projected for the standard form IRA on an appropriate annuity term basis governed by federal tax information at the given year the holder begins distributions, or (b) an after-tax total annuity value thereof, against, (ii) correspondingly, one of (a) an annual distribution amount projected for the Roth form IRA on the same annuity basis, or (b) the total annuity value of the projected Roth form IRA.

7. The computer-implemented process of claim 5 wherein the step of receiving personal information about the IRA holder further includes receiving information as age data, projected IRA growth rate, estimated AGI in each of the given years 1998 through 2001 as well as the at least one given year between ages 59 and 71, and estimated number of dependents and filing status in all the given years.

8. The computer-implemented process of claim 5 wherein the step of receiving personal information about the IRA holder further includes receiving information as age data, projected IRA growth rate, estimated AGI for one chosen year between 1998 and 2001 as well as the at least one given year between ages 59 and 71, and estimated number of dependents and filing status in the chosen and given years.

9. The computer-implemented process of claim 5 further comprising:

determining a reduced given-IRA amount by deducting from the given IRA amount the federal tax consequences of conversion; and processing the information for the financial consequences of converting the reduced given-IRA amount from a standard form IRA to a Roth form IRA by generating and displaying for comparison (i) one of (a) an after-tax annual distribution amount projected for the standard form IRA on an appropriate annuity term basis governed by federal tax information at the given year the holder begins distributions, or (b) an after-tax total annuity value thereof, against, (ii) correspondingly, one of (a) an annual distribution amount projected for the Roth form IRA on the same annuity basis, or (b) the total annuity value of the projected Roth form IRA.

10. The computer-implemented process of claim 5 further comprising:

one of receiving federal tax increase information and extracting federal tax rate increase tax information from a database, which tax rate increase information applies to the at least one given year between ages 59 and 71 in which the holder opts to begin IRA distributions.

* * * * *

(12) EX PARTE REEXAMINATION CERTIFICATE (9236th)

United States Patent
Crockett

(10) Number: US 6,058,376 C1
(45) Certificate Issued: Aug. 28, 2012

(54) PROCESS FOR EVALUATING THE FINANCIAL CONSEQUENCES OF CONVERTING A STANDARD FORM I.R.A. TO THE ROTH FORM I.R.A.

(76) Inventor: David A. Crockett, Marionville, MO (US)

Reexamination Request:
No. 90/009,972, Dec. 13, 2011

Reexamination Certificate for:
| Patent No.: | 6,058,376 |
| Issued: | May 2, 2000 |
| Appl. No.: | 08/999,151 |
| Filed: | Dec. 29, 1997 |

(51) Int. Cl.
*G06Q 40/00* (2006.01)
*G06Q 10/00* (2006.01)

(52) U.S. Cl. .................. 705/36 T; 705/36 R; 705/4
(58) Field of Classification Search .................. None
See application file for complete search history.

(56) References Cited

To view the complete listing of prior art documents cited during the proceeding for Reexamination Control Number 90/009,972, please refer to the USPTO's public Patent Application Information Retrieval (PAIR) system under the Display References tab.

*Primary Examiner* — Samuel Rimell

(57) ABSTRACT

Disclosed is a computer-implemented process for evaluating the financial consequences of converting a standard format IRA to a new Roth form IRA. The process includes computing and disclosing the substantial federal income tax consequences involved in converting the standard form IRA to the Roth form. It further includes multiple options that how a given IRA holder can cope with the substantial tax consequences, including without limitation how he or she will fare if he or she obtains term insurance on the federal tax liability of early withdrawal by reason of premature death, or if he or she deducts the federal taxes and insurance premium from the rollover amount, or in the alternative how he or she will fare by financing the federal tax consequences and insurance premium in order to preserve intact the entire IRA amount for rollover. Additionally, the disclosed process allows IRA holders to enter into the calculations estimated increases in federal tax rates which would be in effect in their retirement years. Whereas it is not known how the federal tax rates will change (if at all) in the ensuing years, the disclosed process will allow entry of educated guesses so that a given IRA holder can work through various chosen scenarios to see how he or she will fare under the chosen scenarios.

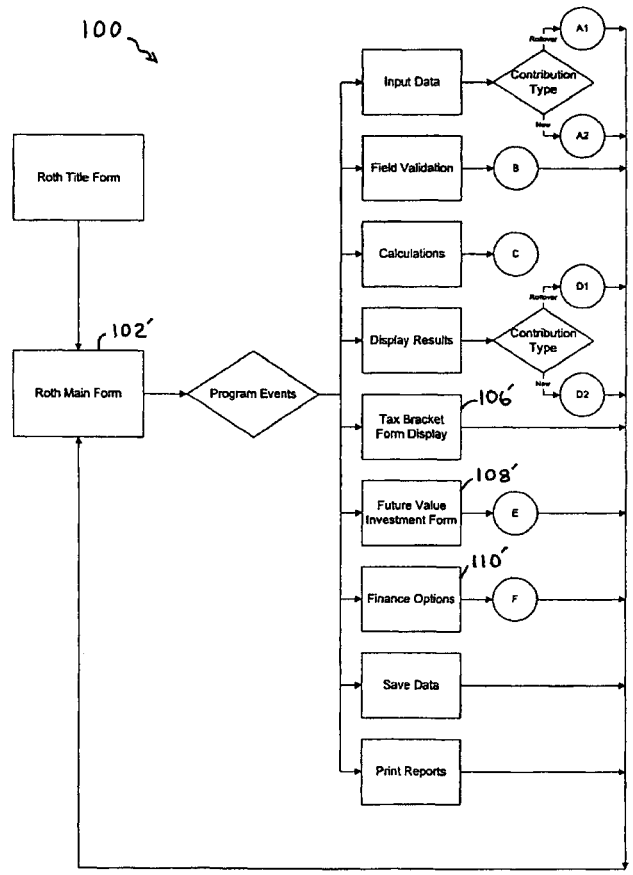

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *